United States Patent
Hu et al.

(10) Patent No.: US 10,983,302 B2
(45) Date of Patent: *Apr. 20, 2021

(54) LENS DRIVING MECHANISM

(71) Applicant: TDK TAIWAN CORP., Taoyuan (TW)

(72) Inventors: Chao-Chang Hu, Taoyuan (TW);
Bing-Ru Song, Taoyuan (TW);
Chih-Wei Weng, Taoyuan (TW);
Shu-Shan Chen, Taoyuan (TW)

(73) Assignee: TDK TAIWAN CORP., Yangmei Taoyuan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/583,595

(22) Filed: Sep. 26, 2019

(65) Prior Publication Data
US 2020/0018924 A1  Jan. 16, 2020

Related U.S. Application Data

(63) Continuation of application No. 15/639,793, filed on Jun. 30, 2017, now Pat. No. 10,466,437.

(Continued)

(30) Foreign Application Priority Data

Jun. 26, 2017 (CN) .......................... 201710495566.X

(51) Int. Cl.
*G02B 27/64* (2006.01)
*G02B 7/10* (2021.01)
(Continued)

(52) U.S. Cl.
CPC ............... *G02B 7/10* (2013.01); *G02B 7/021* (2013.01); *G02B 7/08* (2013.01); *G02B 7/09* (2013.01); *G02B 27/646* (2013.01)

(58) Field of Classification Search
CPC ........ G02B 13/02; G02B 7/09; H04N 5/2254; H04N 5/2252; H04N 5/2258; H02K 33/12
(Continued)

(56) References Cited

U.S. PATENT DOCUMENTS 6,215,920 B1 *  4/2001  Whitehead ............. G02B 26/02
                                                    349/63
7,564,614 B2 *  7/2009  Chen ....................... G02F 1/167
                                                    359/295
(Continued)

FOREIGN PATENT DOCUMENTS

| CN | 102590977 A | 7/2012 |
| CN | 103207499 A | 7/2013 |
| CN | 203933331 U | 11/2014 |

OTHER PUBLICATIONS

Office Action of corresponding CN Application No. 201710495566. X, dated Oct. 29, 2019, 4 pages.

*Primary Examiner* — William R Alexander
*Assistant Examiner* — Tamara Y. Washington
(74) *Attorney, Agent, or Firm* — Muncy, Geissler, Olds & Lowe, P.C.

(57) ABSTRACT

A lens driving mechanism is provided for driving a first lens and a second lens to move, wherein light enters the first and second lenses along a light incident direction. The lens driving mechanism includes a first base movably connected to the first lens, a first driving assembly, and a second driving assembly. The first driving assembly has a first magnet and a first coil corresponding thereto for moving the first lens. The second driving assembly has a second magnet and a second coil corresponding thereto for moving the second lens. The first magnet is adjacent to the second magnet, and the polar direction of the first magnet is parallel to the light incident direction.

20 Claims, 17 Drawing Sheets

Related U.S. Application Data

(60) Provisional application No. 62/357,557, filed on Jul. 1, 2016.

(51) Int. Cl.
  *G02B 7/09* (2021.01)
  *G02B 7/02* (2021.01)
  *G02B 7/08* (2021.01)

(58) Field of Classification Search
  USPC .................................. 359/554–557
  See application file for complete search history.

(56) References Cited

U.S. PATENT DOCUMENTS

| | | | |
|---|---|---|---|
| 8,531,534 B2* | 9/2013 | Hu | G02B 7/08 |
| | | | 348/208.11 |
| 9,491,364 B2 | 11/2016 | Shin | |
| 9,772,506 B2 | 9/2017 | Hu et al. | |
| 9,866,817 B2 | 1/2018 | Hsu et al. | |
| 9,885,880 B2 | 2/2018 | Hu et al. | |
| 9,904,070 B2 | 2/2018 | Hu et al. | |
| 9,904,072 B2 | 2/2018 | Fan et al. | |
| 9,958,756 B2 | 5/2018 | Hu et al. | |
| 9,995,945 B2 | 6/2018 | Hu et al. | |
| 10,019,031 B2 | 7/2018 | Hu | |
| 2002/0101799 A1* | 8/2002 | Nishikawa | G11B 7/1378 |
| | | | 369/44.23 |
| 2008/0019682 A1* | 1/2008 | Hsiao | G02B 7/102 |
| | | | 396/85 |
| 2008/0024879 A1* | 1/2008 | Shih | G02B 7/102 |
| | | | 359/698 |
| 2010/0148385 A1* | 6/2010 | Balko | G02F 1/167 |
| | | | 264/4.1 |
| 2011/0141564 A1* | 6/2011 | Sata | G02B 7/102 |
| | | | 359/557 |
| 2011/0176046 A1* | 7/2011 | Hu | G02B 7/08 |
| | | | 348/335 |
| 2012/0229926 A1* | 9/2012 | Wade | G02B 7/08 |
| | | | 359/824 |
| 2013/0136438 A1* | 5/2013 | Lee | G03B 3/10 |
| | | | 396/133 |
| 2013/0141541 A1* | 6/2013 | Jung | G03B 35/08 |
| | | | 348/46 |
| 2013/0265394 A1 | 10/2013 | Lim | |
| 2014/0368914 A1 | 12/2014 | Hu et al. | |
| 2014/0376090 A1* | 12/2014 | Terajima | G02B 27/646 |
| | | | 359/557 |
| 2015/0160470 A1* | 6/2015 | Terajima | G02B 27/646 |
| | | | 359/557 |
| 2015/0181125 A1* | 6/2015 | Noguchi | H04N 5/23287 |
| | | | 348/208.11 |
| 2015/0362696 A1* | 12/2015 | Han | G02B 27/646 |
| | | | 359/824 |
| 2015/0370031 A1* | 12/2015 | Tikkanen | G02B 7/023 |
| | | | 359/824 |
| 2016/0025995 A1* | 1/2016 | Ariji | G02B 7/08 |
| | | | 359/557 |
| 2016/0178925 A1* | 6/2016 | Park | G02B 7/09 |
| | | | 359/557 |
| 2016/0182829 A1* | 6/2016 | Shin | G03B 3/02 |
| | | | 348/208.11 |
| 2016/0209621 A1* | 7/2016 | Park | G02B 7/08 |
| 2017/0329151 A1* | 11/2017 | Hu | G02B 27/646 |
| 2018/0003920 A1* | 1/2018 | Hu | G02B 7/10 |
| 2018/0059356 A1* | 3/2018 | Wu | G02B 7/021 |
| 2018/0100984 A1* | 4/2018 | Wu | G02B 7/023 |
| 2018/0157059 A1 | 6/2018 | Ma et al. | |
| 2018/0210317 A1 | 7/2018 | Hu et al. | |
| 2018/0224628 A1 | 8/2018 | Hu et al. | |
| 2018/0246344 A1* | 8/2018 | Hu | G02B 27/646 |

* cited by examiner

LENS DRIVING MECHANISM

This application is a continuation application of U.S. patent application Ser. No. 15/639,793, filed Jun. 30, 2017, which claims the priority of U.S. Provisional Application No. 62/357,557, filed on Jul. 1, 2016 and China Patent Application No. 201710495566.X, filed on Jun. 26, 2017, the entirety of which are incorporated by reference herein.

BACKGROUND OF THE INVENTION

Field of the Invention

The invention relates to a lens driving mechanism, and more particularly to a lens driving mechanism that can move lenses using electromagnetic force.

Description of the Related Art

In existing dual-lens camera systems, two lens driving modules are usually arranged close to each other, and as a result, magnetic interference between the magnets of the two lens driving modules is likely to occur, causing the focus speed and accuracy of the lenses to be adversely affected. Therefore, what is needed is a dual-lens camera system that can prevent magnetic interference between the two lens driving modules.

BRIEF SUMMARY OF THE INVENTION

In view of the aforementioned problems, an object of the invention is to provide a lens driving mechanism that can reduce the magnetic interference generated by the magnetic elements of the lens driving modules, thereby improving the focus speed and accuracy of the lenses in the camera system.

An embodiment of the invention provides a lens driving mechanism for driving a first lens and a second lens to move, wherein light enters the first and second lenses along a light incident direction. The lens driving mechanism includes a first base movably connected to the first lens, a first driving assembly, and a second driving assembly. The first driving assembly has a first magnet and a first coil corresponding thereto for moving the first lens. The second driving assembly has a second magnet and a second coil corresponding thereto for moving the second lens. The first magnet is adjacent to the second magnet, and the polar direction of the first magnet is parallel to the light incident direction.

In some embodiments, the lens driving mechanism further includes a magnetic permeable element connected to the first magnet.

In some embodiments, the magnetic permeable element is disposed on a side of the first magnet, and the first magnet is located between the magnetic permeable element and the first coil.

In some embodiments, the polar direction of the second magnet is perpendicular to the light incident direction.

In some embodiments, the first magnet comprises a multipolar magnet having a first magnetic portion and a second magnetic portion, and the polar directions of the first and second portions are opposite to each other and parallel to the light incident direction.

In some embodiments, the thickness of the second magnet along the light incident direction is greater than the thickness of the first magnet along the light incident direction.

In some embodiments, the polar direction of the second magnet is parallel to the light incident direction.

In some embodiments, the first and second magnets respectively comprise a multipolar magnet, and the polar directions of the first and second magnets are parallel to the light incident direction.

In some embodiments, the first coil is disposed on the first base, corresponding to the first magnet to move the first lens relative to the first base along a horizontal direction, wherein the horizontal direction is perpendicular to the light incident direction.

In some embodiments, the lens driving mechanism further includes a second base, and the second coil is disposed on the second base and corresponds to the second magnet, to move the second lens relative to the second base.

In some embodiments, the lens driving mechanism further includes a lens holder with the first lens received therein, a frame connected to the first base, a magnetic field sensor disposed on an outer side of the lens holder, and a magnetic element disposed on the frame, wherein the magnetic field sensor measures the magnetic field strength of the magnetic element to learn the position offset of the first lens holder relative to the first base.

In some embodiments, the lens driving mechanism further includes a conductive circuit formed on the lens holder by insert molding, Laser Direct Structuring, or Molded Interconnect Devices technology, wherein the first coil is a planar coil disposed on the lens holder and electrically connected to the conductive circuit.

In some embodiments, the lens holder has a substantially rectangular structure, and the magnetic field sensor is disposed at a corner of the lens holder.

In some embodiments, the lens holder has a substantially rectangular structure, and the magnetic field sensor and the magnetic element are disposed on a side of the lens holder, corresponding to the first magnet.

In some embodiments, the lens driving mechanism further includes a magnetic permeable element connected to the first magnet and situated between the magnetic element and the first magnet.

In some embodiments, the lens driving mechanism further includes a lens holder with the first lens received therein, a frame connected to the first base, a reference magnet affixed to the frame, and a magnetic field sensor disposed on an outer side of the lens holder and above the first coil, wherein the first coil magnetically cooperate with the reference magnet to move the lens holder relative to the frame along the light incident direction, and the magnetic field sensor measures the magnetic field strength of the reference magnetic to learn the position offset of the first lens relative to the first base.

In order to illustrate the purposes, features, and advantages of the invention, the preferred embodiments and drawings of the invention are shown in detail as follows.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The making and using of the embodiments of a lens driving mechanism are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
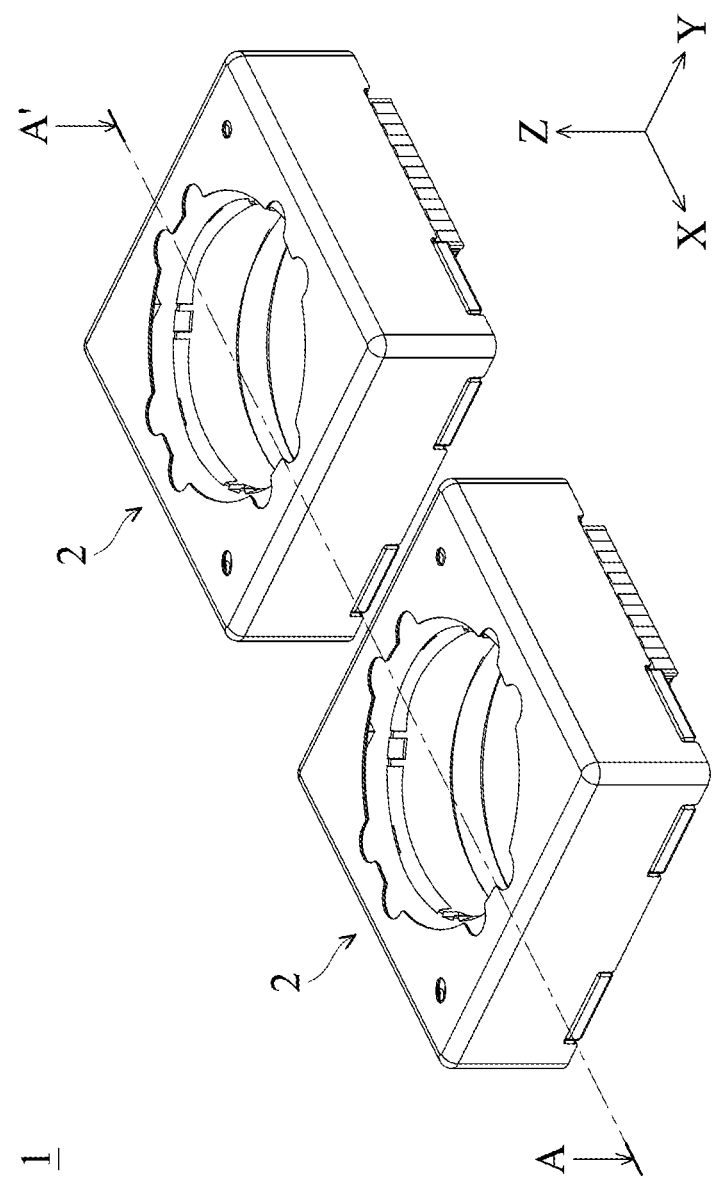
FIG. 1 is a schematic view of a lens driving mechanism in accordance with an embodiment of the invention.
Figure 2:
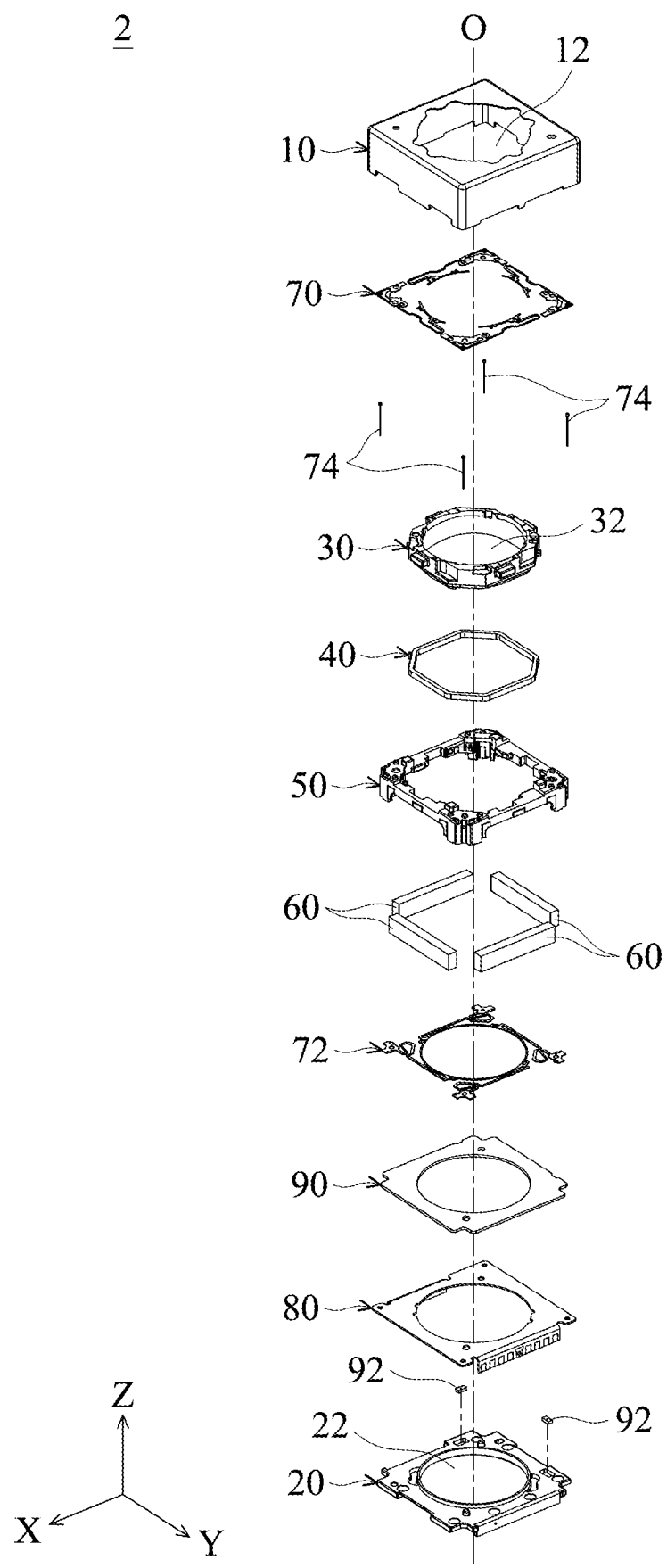
FIG. 2 is an exploded view of the lens driving module in FIG. 1.
Figure 3:
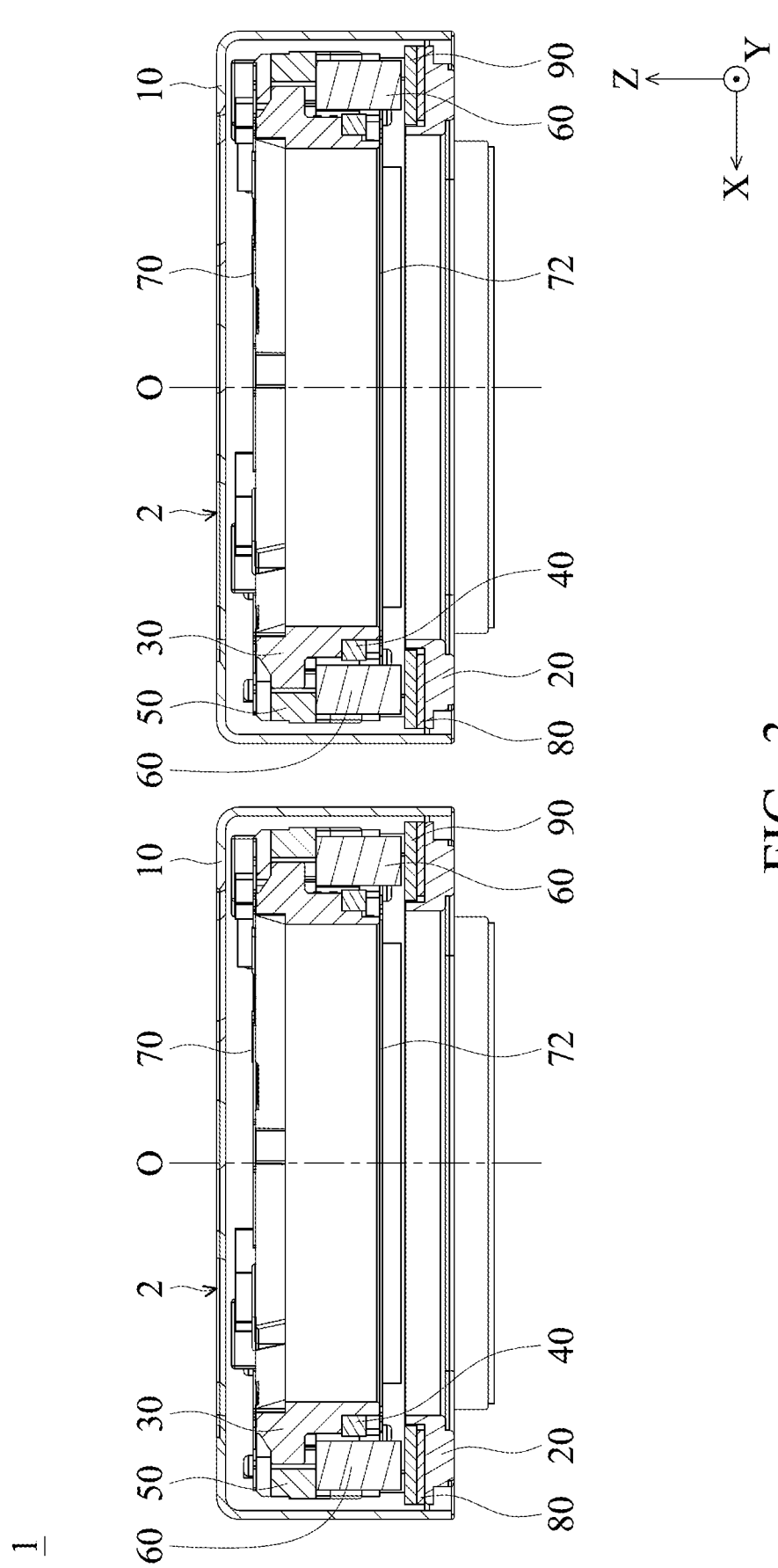
FIG. 3 is a cross-sectional view taken along line A-A' in FIG. 1.

Referring to FIGS. 1-3, FIG. 1 is a perspective diagram of a lens driving mechanism 1 according to an embodiment of the invention, FIG. 2 is an exploded diagram of a lens driving module 2 of the lens driving mechanism 1 in FIG. 1, and FIG. 3 is a sectional view along line A-A' in FIG. 1. In this embodiment, two lens driving modules 2 of the lens driving mechanism 1 may comprise Voice Coil Motors (VCMs) which are arranged along a longitudinal direction (the X axis) and may be disposed in a handheld electronic device, such as mobile phone or tablet computer. The two lens driving modules 2 may have the same specification and are capable of Optical Image Stabilization (OIS) and Auto focusing (AF), but the invention is not limited thereto.

As shown in FIG. 1-3, each of the lens driving modules 20 primarily comprises a top casing 10, a base 20, a lens holder 30, a coil 40, a frame 50, four magnets 60, an upper spring sheet 70, a lower spring sheet 72, a plurality of flexible members 74, a circuit board 80, a driving board 90, and two magnetic sensors 92.

The top casing 10 has a hollow structure and is affixed to the base 20. It should be noted that the top casing 10, the base 20, and the lens holder 30 respectively form holes 12, 22, and 32, wherein an optical lens is secured in the hole 32 of the lens holder 30. Light can enter the lens driving module 2 via the hole 12 along the optical axis O of the lens (the light incident direction) and propagate sequentially through the lens and the hole 22 to an image sensor (not shown) below the base 20.

The coil 40 is wound around the outer peripheral surface of the lens holder 30, and the four magnets 60 are affixed to four sides of the frame 50, corresponding to the coils 40.

Figure 4:
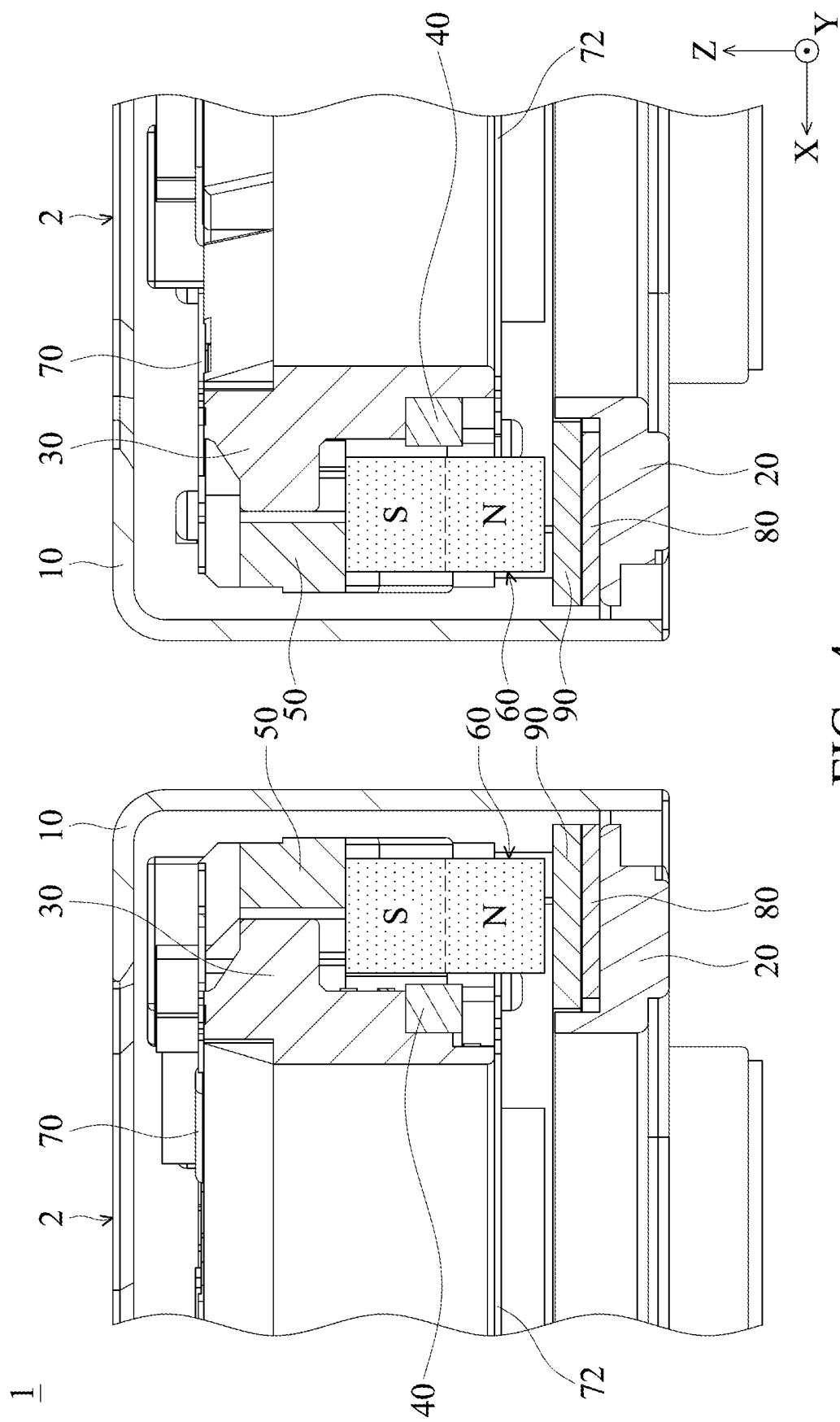
FIG. 4 is a partial enlarged view of the lens driving mechanism in FIG. 3.

In this embodiment, the lens holder 30 and the lens therein are suspended in the center of the frame 50. More specifically, the lens holder 30 is movably connected to the frame 50 by the upper spring 70 and the lower spring 72 made of a metal material. When current is supplied to the coil 40, the coil 40 can act with the magnetic field of the magnets 60 to generate a magnetic force to move the lens holder 30 and the lens along the Z axis with respect to the frame 50. In some embodiments, the four magnets 60 may include at least one bipolar or multipolar magnet, and the polar directions (N-S) of some of the magnets 60 may be perpendicular to the Z axis. Specifically, as shown in FIG. 4, the polar directions (N-S) of the two adjacent magnets 60 respectively in the two lens driving modules 2 may be parallel to the Z axis.

One end of the four suspension wires 74 is affixed to the circuit board 80 and the other end is connected to the upper spring 70, so that the frame 50, the lens holder 30 and the lens therein can move relative to the base 20 along a horizontal direction. In some embodiments, the suspension wires 74 may comprise a metal material.

The circuit board 80, such as a flexible printed circuit board (FPC), is affixed to the base 20 and electrically connected to the driving board 90. In this embodiment, the circuit board 80 not only transmits electrical signals to the driving board 90, but also transmits electrical signals to the coils 40 through the suspension wires 74 and the upper spring 70, thereby performing the AF and OIS functions.

In this embodiment, two magnetic field sensing elements 92 are respectively mounted on two sides of the base 20. The two magnetic field sensing elements 92 may be Hall effect sensors, MR sensors, or Fluxgate sensors, and can be used to learn the position offset amount of the frame 50 and the lens holder 30 with respect to the base 20 in the X and Y directions.

As shown in FIGS. 3 and 4, because the two lens driving modules 2 in the lens driving mechanism 1 are close to each other, magnetic interference between two adjacent magnets 60 respectively in the two lens driving modules 2 is likely to occur, causing the focus speed and accuracy of the lenses to be adversely affected. To address the aforementioned problem, the polar directions (N-S) of the two adjacent magnets 60 (first and second magnets) respectively in the lens driving modules 2 are both parallel to the Z axis (FIG. 4). Thus, adverse influence to the focus speed and accuracy of the lenses (first and second lenses) in the lens driving modules 2 due to magnetic interference therebetween can be efficiently prevented.

In the left lens driving module 2 of FIG. 4, one of the magnets 60 (first magnets) can cooperate with the coil 40 or the coils disposed in the driving board 90 to constitute a first driving assembly. More specifically, the magnet 60 can magnetically cooperate with the coil 40 (first coil) to generate a magnetic force, so that the lens holder 30 and the lens (first lens) in the left lens driving module 2 can be moved relative to the base 20 (first base) along the Z axis to perform the AF function. Additionally, the magnet 60 in the left lens driving module 2 can also magnetically cooperate with the driving board 90 (first coil) to generate a magnetic force, so that the frame 50, the lens holder 30, and the lens (first lens) in the left lens driving module 2 can be moved together relative to the base 20 (first base) along a horizontal direction to perform the OIS function.

Similarly, in the right lens driving module 2 of FIG. 4, one of the magnets 60 (second magnets) can cooperate with the coil 40 or the coils disposed in the driving board 90 to constitute a second driving assembly. More specifically, the magnet 60 can magnetically cooperate with the coil 40 (second coil) to generate a magnetic force, so that the lens holder 30 and the lens (second lens) in the right lens driving module 2 can be moved relative to the base 20 (second base) along the Z axis to perform the AF function. Additionally, the magnet 60 in the right lens driving module 2 can also magnetically cooperate with the driving board 90 (second coil) to generate a magnetic force, so that the frame 50, the lens holder 30, and the lens (second lens) in the right lens driving module 2 can be moved together relative to the base 20 (second base) along a horizontal direction to perform the OIS function.

Figure 5:
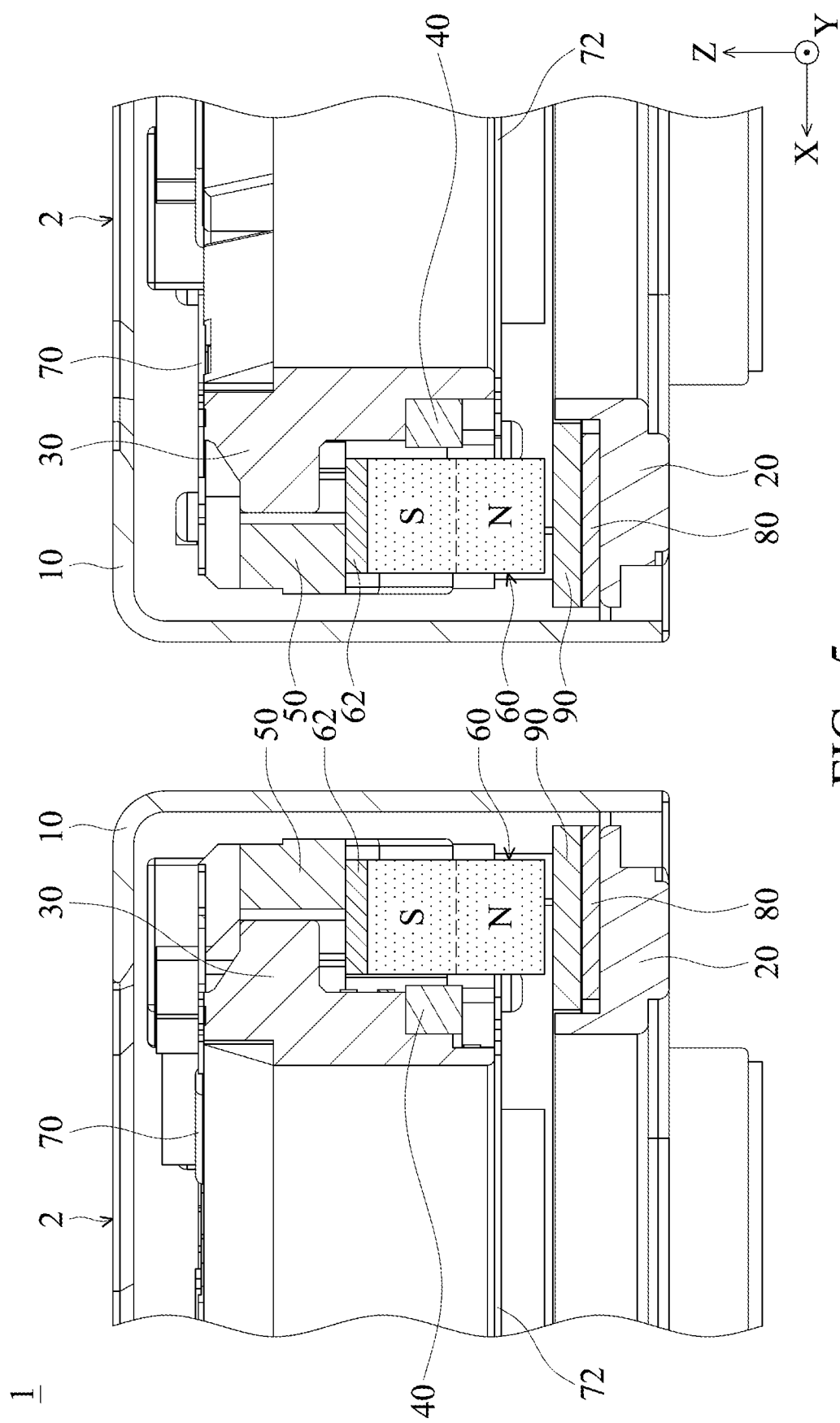
FIG. 5 is a partial cross-sectional view of a lens driving mechanism in accordance with another embodiment of the invention.
Figure 6:
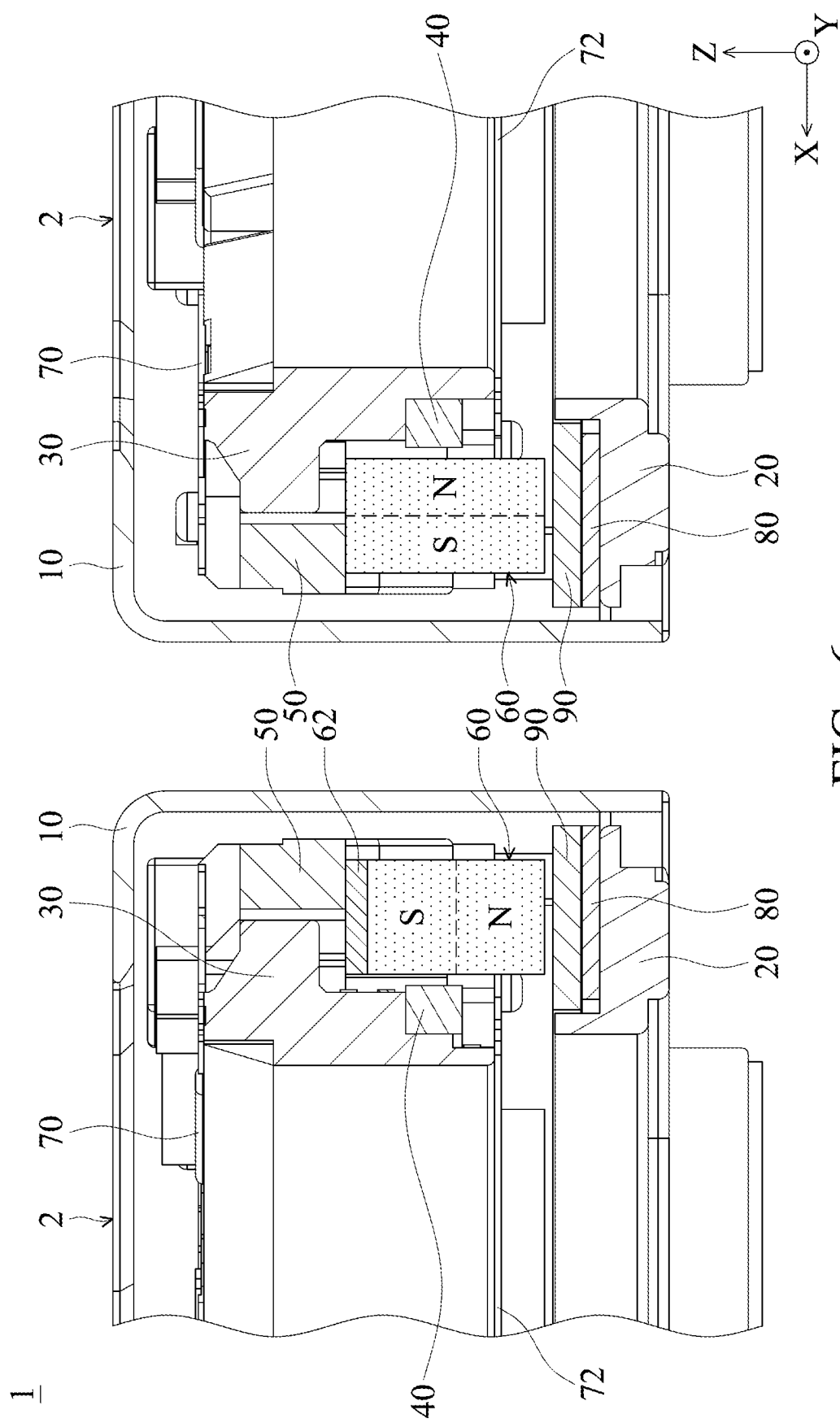
FIG. 6 is a partial cross-sectional view of a lens driving mechanism in accordance with another embodiment of the invention.

Referring to FIG. 5, in another embodiment of the lens driving mechanism 1, two magnetic permeable elements 62 are respectively disposed on the two adjacent magnets 60 of the adjacent lens driving modules 2, so as to further suppress magnetic interference between the two lens driving modules 2. As shown in FIG. 5, the magnets 60 are located between the magnetic permeable elements 62 and the driving boards 90, respectively. Referring to FIG. 6, in another embodiment of the lens driving mechanism 1, a magnetic permeable element 62 is disposed on the top side of the left magnet 60 (first magnet) which has a polar direction (N-S) parallel to the Z axis. More specifically, the magnetic permeable element 62 has a flat structure extending in a direction perpendicular to the polar direction (N-S) of the left magnet 60. On the other hand, the magnet 60 (second magnet) in the right lens driving modules 2 has a polar direction (N-S) perpendicular to the Z axis. Since the polar directions (N-S) of the two adjacent magnets 60 are different, magnetic interference between the two lens driving modules 2 can be suppressed.

Figure 7:
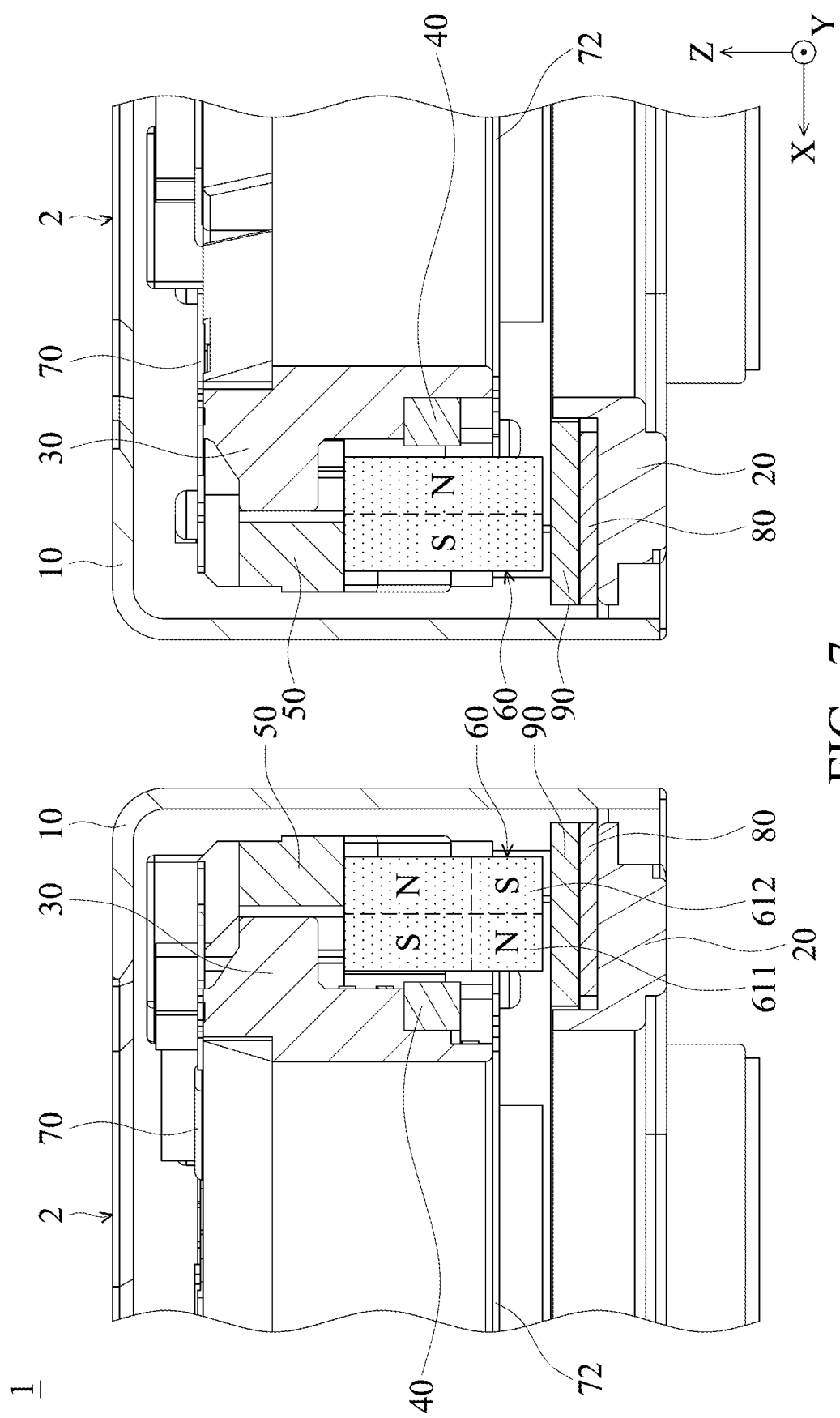
FIG. 7 is a partial cross-sectional view of a lens driving mechanism in accordance with another embodiment of the invention.

Referring to FIG. 7, in another embodiment of the lens driving mechanism 1, the magnet 60 (first magnet) in the left lens driving module 2 comprises a multipolar magnet, such as a quadrapolar magnet. In some embodiments, the magnet 60 may also be constituted by two or more magnetic elements. Since the magnet 60 in the left lens driving module 2 can be magnetized along a vertical direction, it has a polar direction (N-S) parallel to the Z axis. When compared with the vertical direction (the Z axis), the magnet 60 in the left lens driving module 2 can provide a lower magnetic field intensity in the horizontal direction, so that magnetic interference between the two lens driving modules 2 along the horizontal direction can be suppressed. Specifically, as shown in FIG. 7, the magnet 60 (first magnet) in the left lens driving module 2 primarily has a first magnetic portion 611 on the left side and a second magnetic portion 612 on the right side, wherein the polar directions (N-S) of the first and second magnetic portions 611 and 612 are opposite to each other and parallel to the Z axis.

Figure 8:
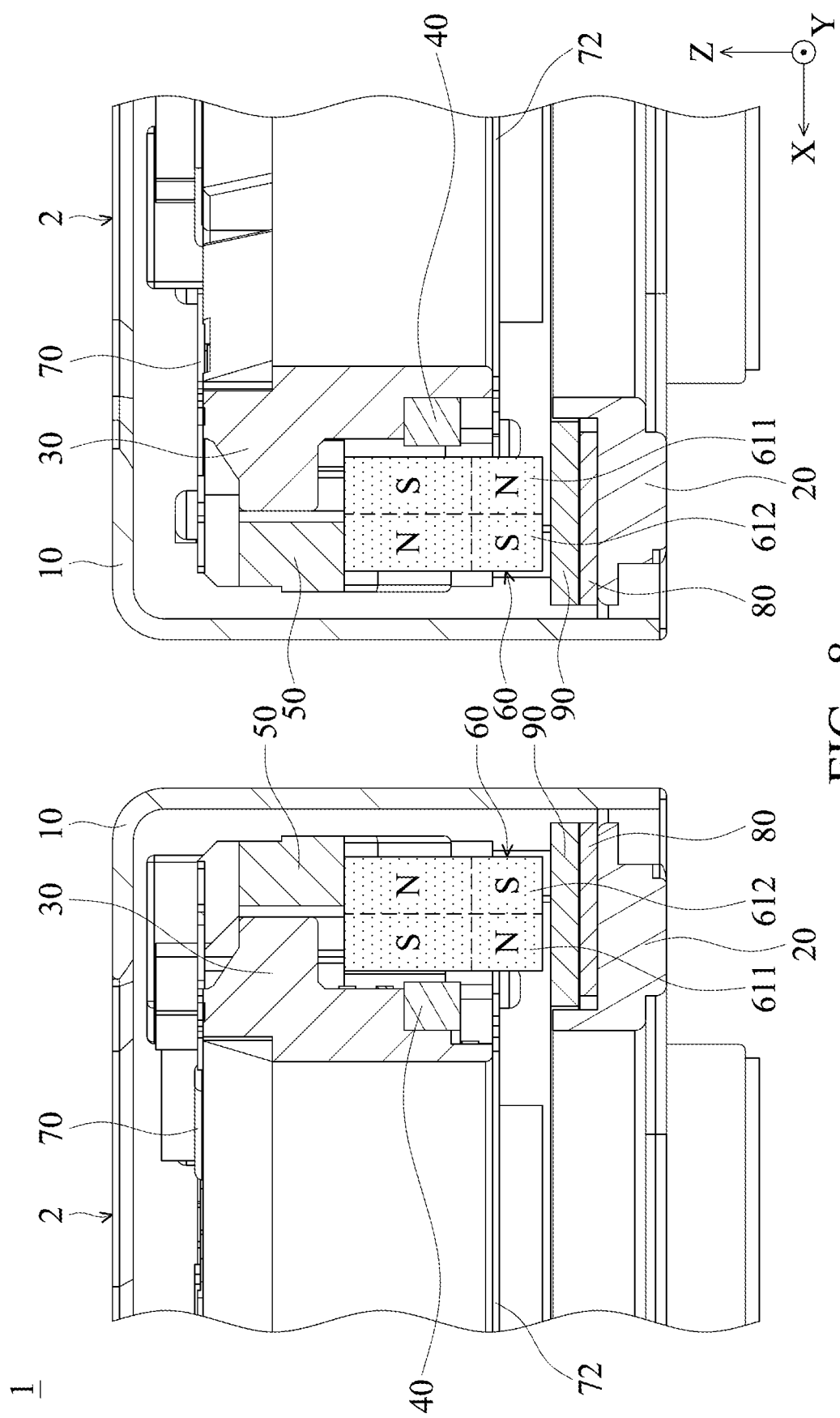
FIG. 8 is a partial cross-sectional view of a lens driving mechanism in accordance with another embodiment of the invention.

Referring to FIG. 8, the two adjacent magnets 60 (first and second magnets) respectively in the two lens driving modules 2 are both multipolar magnets. Since the polar directions (N-S) of the first and second magnetic portions 611 and 612 in the two magnets 60 are both parallel to the Z axis, the magnetic interference between the two lens driving modules 2 can be suppressed, and the focus speed and accuracy of the lenses can therefore be improved.

Figure 9:
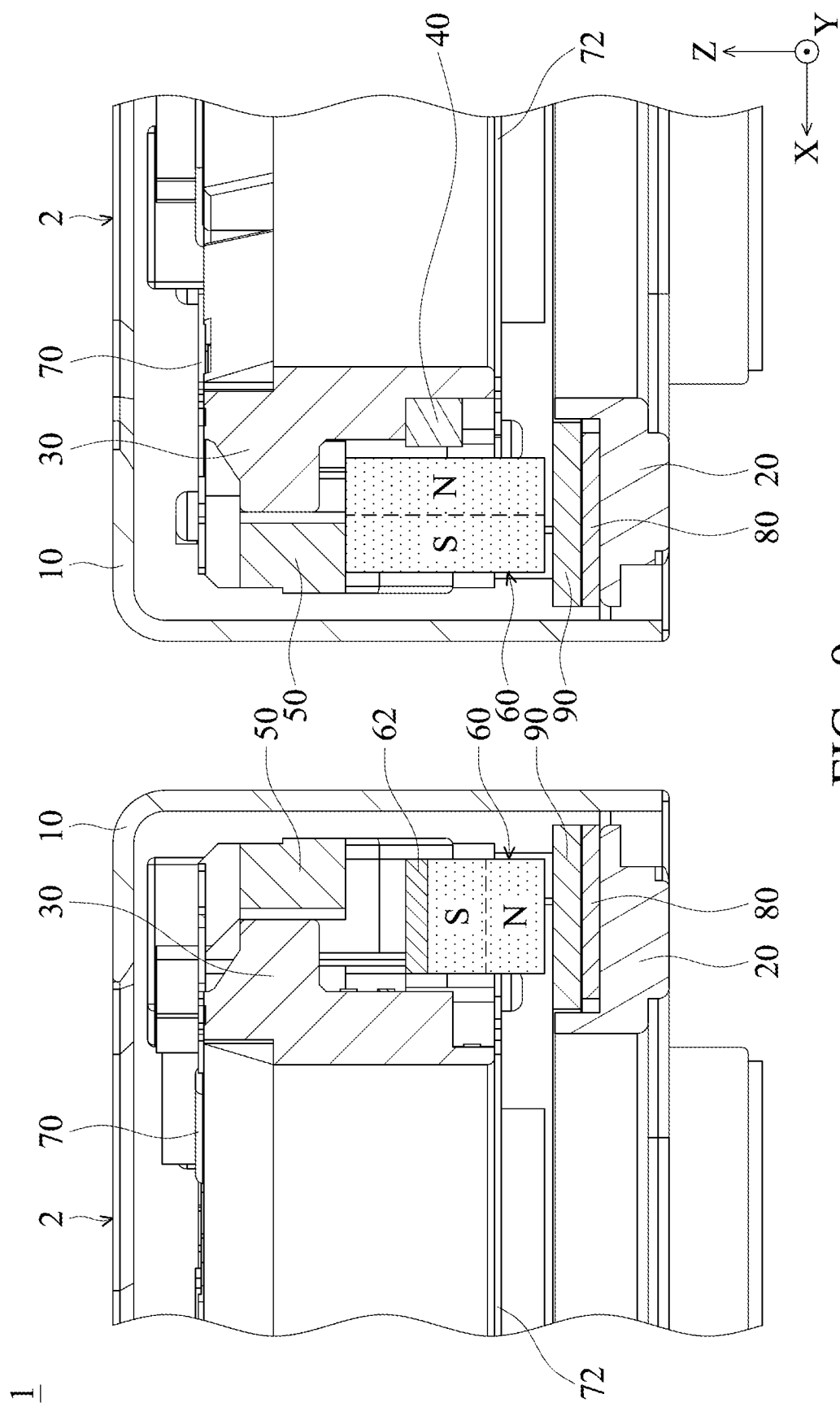
FIG. 9 is a partial cross-sectional view of a lens driving mechanism in accordance with another embodiment of the invention.

Referring to FIG. 9, another embodiment of the magnet 60 (first magnet) in the left lens driving module 2 has a polar direction (N-S) parallel to the Z axis with a magnetic permeable element 62 disposed thereon, however, the polar direction (N-S) of the magnet 60 (second magnet) in the right lens driving module 2 is perpendicular to the Z axis. Specifically, the thickness of the right magnet 60 (second magnet) along the Z axis is greater than the thickness of the left magnet 60 (first magnet) along the Z axis. Moreover, the top surfaces of the left and right magnets 60 are both perpendicular to the light incident direction (Z axis), and the top surface (first top surface) of the left magnet 60 (first magnet) is located at a different height from the top surface (second top surface) of the right magnet 60 (second magnet). Since the magnetic permeable element 62 can suppress magnetic interference between the two magnets 60, and the left and right magnets 60 (first and second magnets) have different polar directions (N-S), the magnetic interference between the two lens driving modules 2 can be efficiently suppressed.

It should be noted that the annular coil 40 wound on the lens holder 30 of the left lens driving module 2 as shown in FIG. 2 is omitted in FIG. 9 because the magnet 60 (first magnet) in the left lens driving module 2 is mainly used to magnetically cooperate with the coil (first coil) in the driving board 90, whereby the frame 50, the lens holder 30 and the lens (first lens) can be moved relative to the base 20 along the horizontal direction to perform the OIS function. However, the AF function can still be achieved by other magnets 60 and coils which are disposed in the left lens driving module 2.

Figure 10A:
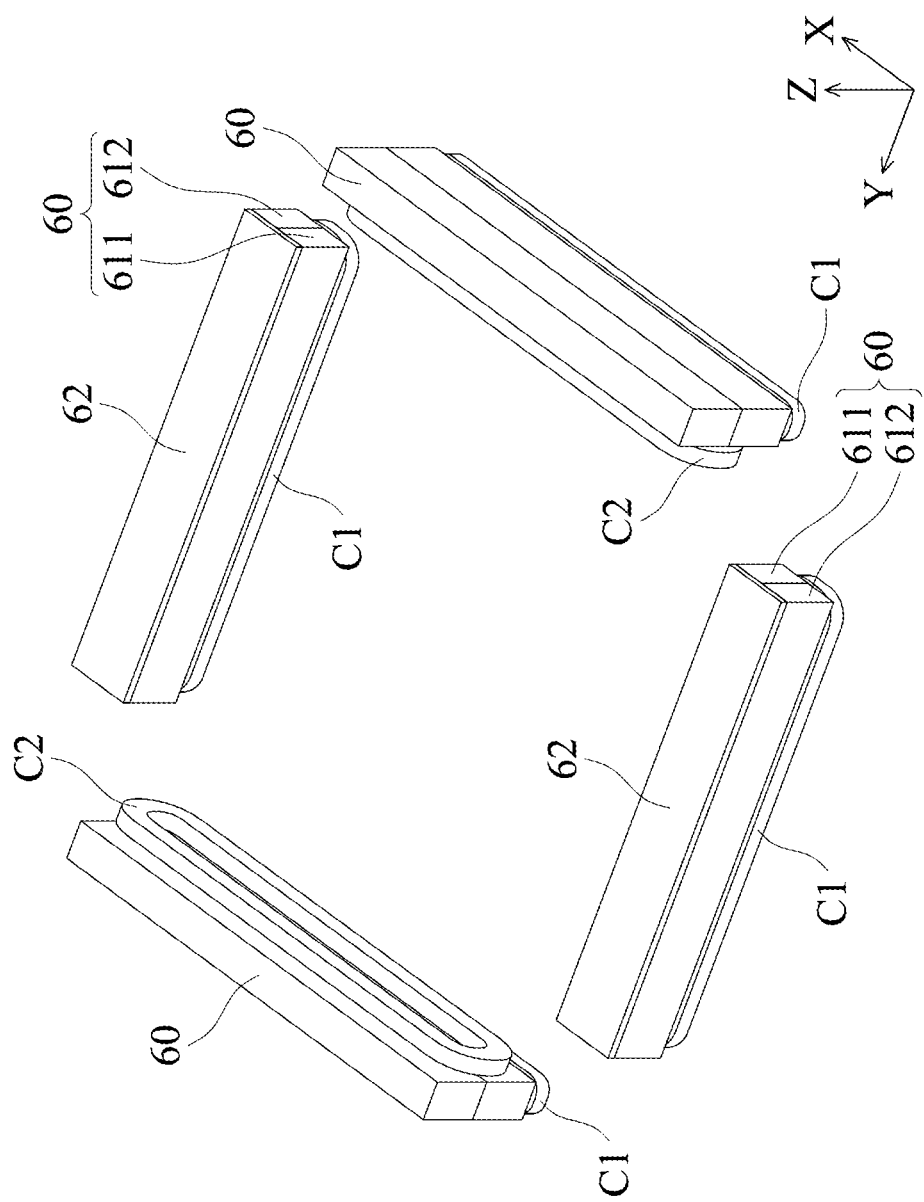
FIG. 10A is a schematic view showing relative positions of the magnets and coils of a lens driving module in accordance with another embodiment of the invention.

In an exemplary embodiment, an arrangement of coils and magnets of FIG. 10A can be applied to either one of the two lens driving modules 2. As shown in FIG. 10A, two pairs of magnets 60 can be arranged in either one of the lens driving modules 2, wherein the magnets 60 may be multipolar magnets corresponding to four coils C1 in the driving board 90 below them, so that the coils C1 can magnetically cooperate with the magnets 60 to produce magnetic forces and perform the OIS function.

Additionally, two oval coils C2 are disposed on opposite sides of the lens holder 30, corresponding to a pair of magnets 60. Since the oval coils C2 can magnetically cooperate with the magnets 60 to produce magnetic forces and perform the AF function, the large coil 40 shown in FIG. 2 is no longer needed. The other pair of magnets 60 are provided with magnetic permeable elements 62 and can magnetically cooperate with the coils C1, so as to produce magnetic forces and perform the OIS function. As the large coil 40 in FIG. 2 can be omitted in the present embodiment by using the oval coils C2, the dimensions of the lens driving module 2 along the X axis can be efficiently reduced, and miniaturization of the lens driving mechanism 1 can be achieved. In some embodiments, the widths of the coils C1 and C2 may exceed the widths of the magnets 60, so that the electromagnetic forces produced by the magnets 60 and the coils C1, C2 can be increased, and the performance of the lens driving mechanism 1 can therefore be improved.

Figure 10B:
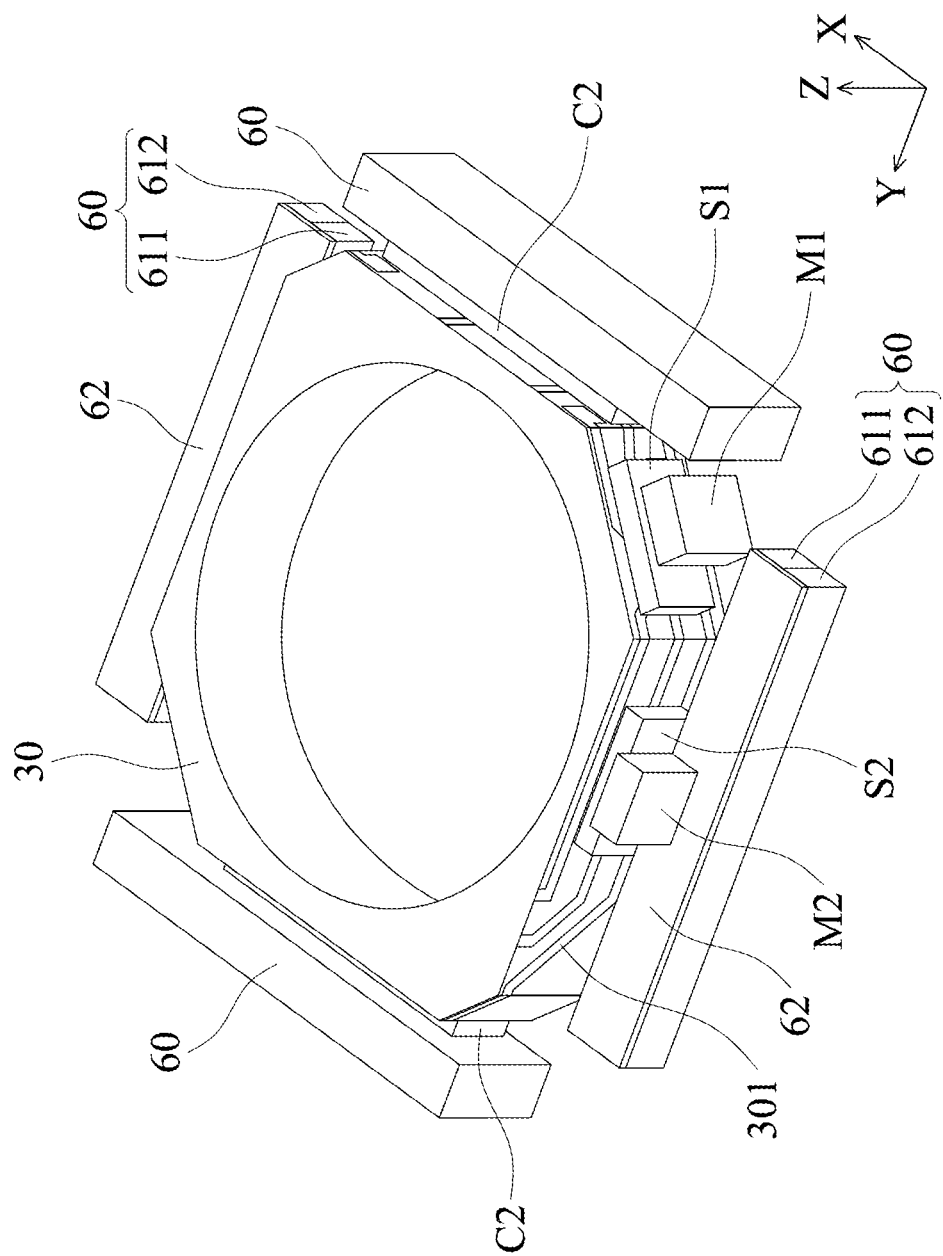
FIGS. 10B to 10D are schematic views showing relative positions of the lens holder, magnets, coils, and two set of magnetic element and magnetic field sensor of a lens driving module in accordance with another embodiment of the invention.
Figure 10C:
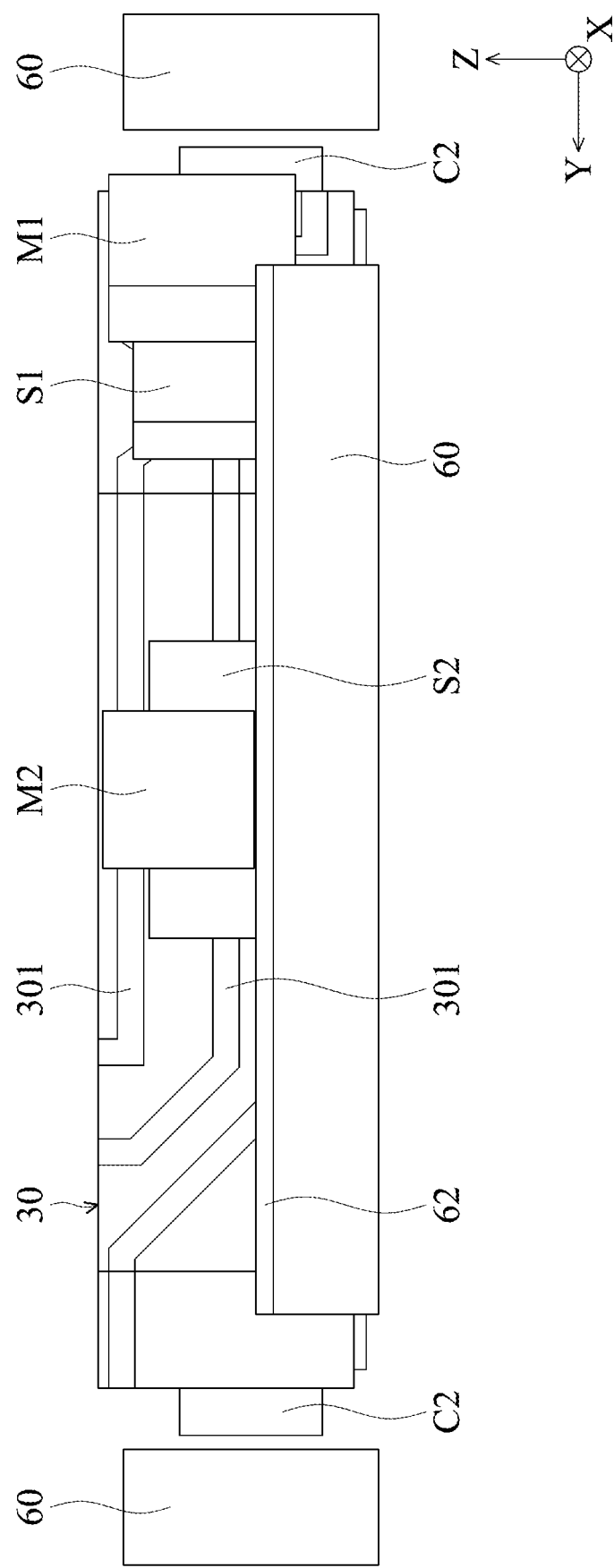
Figure 10D:
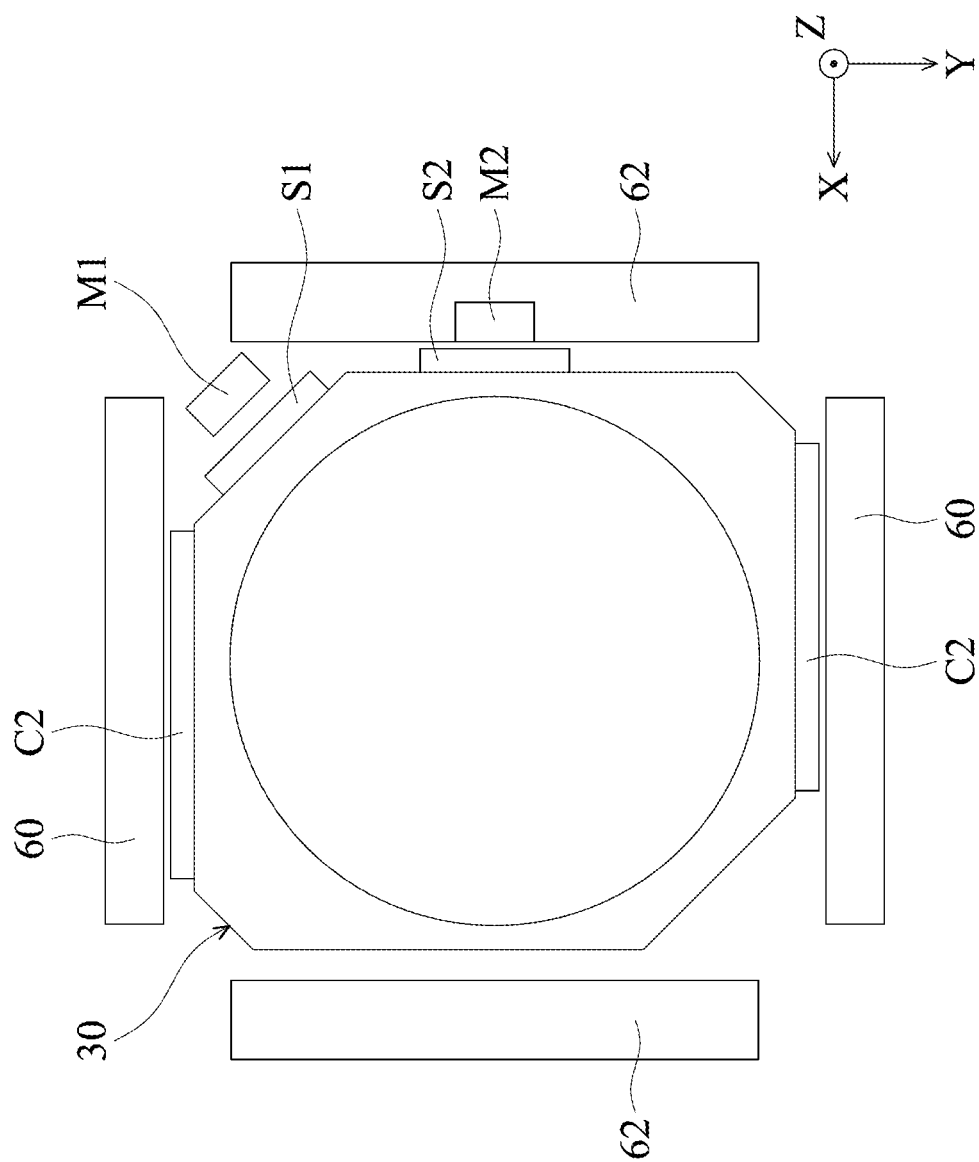
Figure 10:
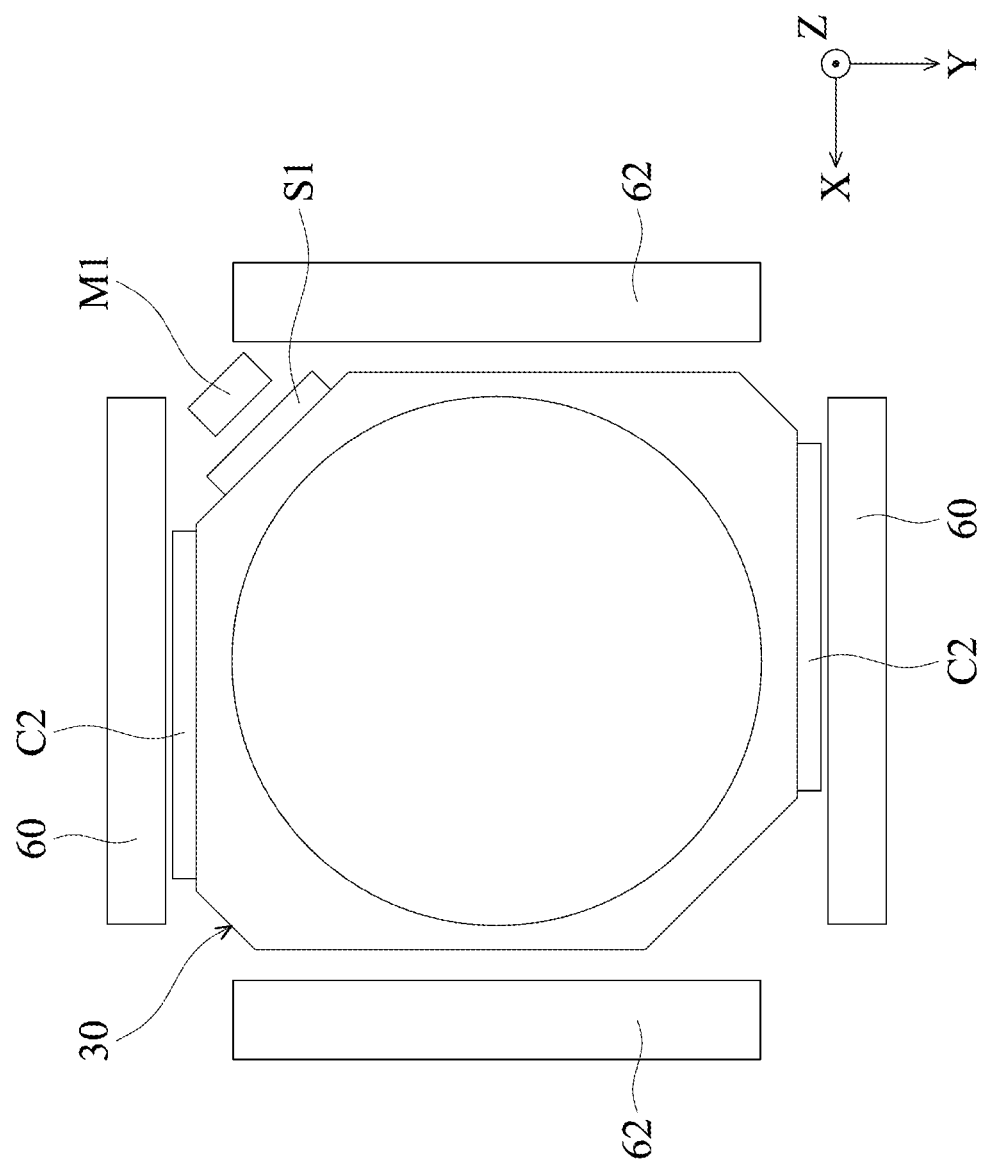
FIG. 10E is a schematic views showing relative positions of the lens holder, magnets, coils, and a set of magnetic element and magnetic field sensor of a lens driving module in accordance with another embodiment of the invention.
FIG. 10F is a schematic views showing relative positions of the lens holder, magnets, coils, and a set of magnetic element and magnetic field sensor of a lens driving module in accordance with another embodiment of the invention.
FIG. 10G is a schematic views showing relative positions of the lens holder, magnets, coils, and a magnetic field sensor of a lens driving module in accordance with another embodiment of the invention.

FIGS. 10B to 10D show relative positions of the lens holder, magnets, coils and magnetic field sensors of a lens driving module in accordance with another embodiment of the invention. In this embodiment, at least a conductive circuit 301 is formed on the lens holder 30 by insert molding, Laser Direct Structuring (LDS) or Molded Interconnect Devices (MID). Two magnetic field sensors S1 and S2 (position sensors) are disposed on an outer surface of the lens holder 30 and electrically connected to the conductive circuit 301. Accordingly, two magnetic elements M1 such as permanent magnets are affixed to the frame 50 (FIG. 2). While the lens holder 30 and the lens therein move relative to the frame 50 along the Z axis, the two magnetic field sensors S1 and S2 can measure the magnetic field strengths of the magnetic elements M1 and M2, so as to learn the position offset of the lens holder 30 and the lens (first lens) therein with respect to the frame 50 and the base 20 (first base) in the Z direction.

As shown in FIGS. 10B to 10D, the magnetic field sensor S1 and the magnetic element M1 are close to each other and located at a corner of the lens holder 30. The magnetic field sensor S2 and the magnetic element M2 are close to each other and located on a side of the substantially rectangular lens holder 30, wherein the magnetic element M2 is located above one of the magnetic permeable elements 62 (FIG. 10C). That is, the magnetic permeable element 62 is situated between the magnetic element M2 and the magnet 60 (first magnet) below the magnetic permeable element 62, so that magnetic interference between the magnetic element M2 and the magnet 60 can be suppressed.

The two coils C2 (first coils) in FIGS. 10B to 10D may be oval or planar coils embedded in a substrate which is disposed on an outer surface of the lens holder 30, and they can magnetically cooperate with the corresponding magnets 60 to perform the AF function. It should be noted that the coils C2 are also electrically connected to conductive circuit 301 and communicated with the magnetic field sensing elements S1 and S2 through a controller, so that a closed-loop control for the AF function can be achieved. In an exemplary embodiment, the two magnetic field sensing elements S1 and S2 may be Hall effect sensors, MR sensors, or Fluxgate sensors.

Figure 10F:
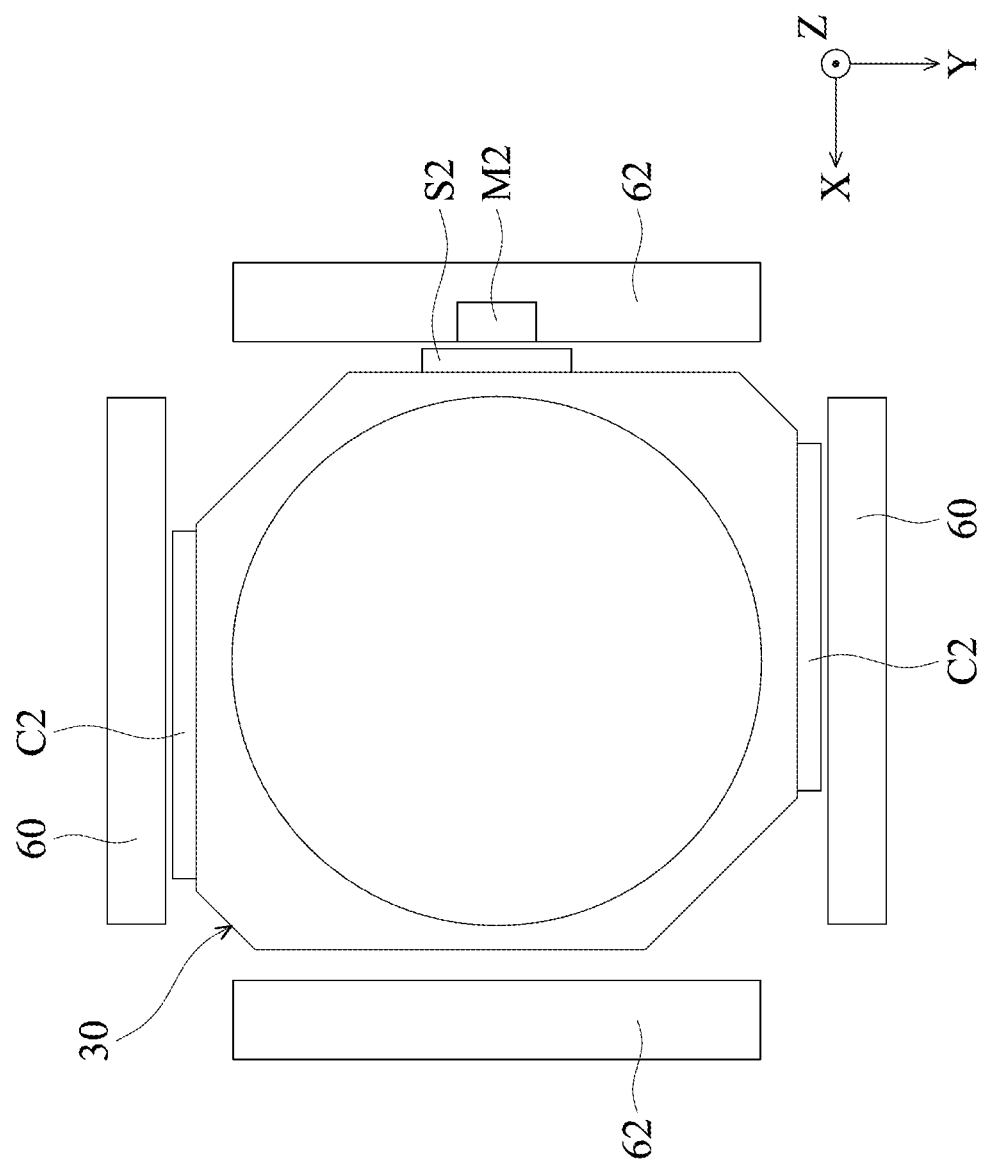

Referring to FIG. 10E, in this embodiment, only the magnetic field sensor S1 and the magnetic element M1 are provided in the lens driving module to learn the position offset amount of the lens holder 30 with respect to the frame 50 in the Z direction, wherein the magnetic field sensor S1 and the magnetic element M1 are arranged at a corner of the lens holder 30. In another embodiment, as shown in FIG. 10F, only the magnetic field sensor S2 and the magnetic element M2 are provided in the lens driving module to learn the position offset amount of the lens holder 30 with respect to the frame 50 in the Z direction, wherein the magnetic field sensor S2 and the magnetic element M2 are arranged on a side of the substantially rectangular lens holder 30, corresponding to one of the magnets 60 below the magnetic permeable element 62.

Figure 10G:
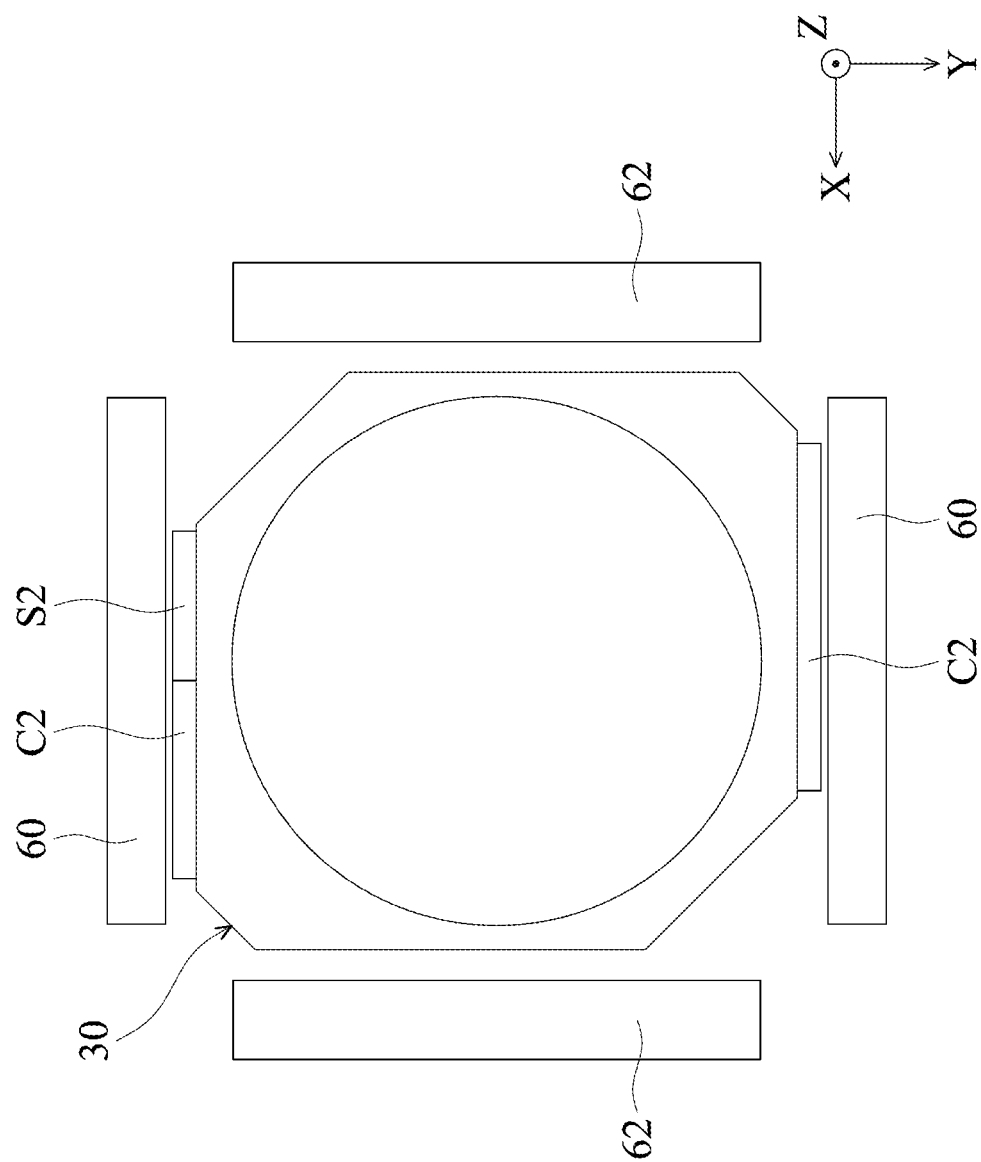

Referring to FIG. 10G, another embodiment of the magnetic field sensor S2 can also be disposed on an outer side of the lens holder 30 and located above one of the coils C2 (first coils). The coil C2 (first coil) below the magnetic field sensor S2 can magnetically cooperate with the corresponding magnet 60 (reference magnet) which is affixed to the frame 50 and close to the magnetic field sensor S2, so as to move the lens holder 30 relative to the frame along the Z axis. Additionally, the magnetic field sensor S2 can measure the magnetic field strength of the magnet 60 (reference magnet), to learn the position offset amount of the lens holder 30 with respect to the frame 50 in the Z direction. In the configuration of FIG. 10G, since the magnetic field sensor S2 can directly measure the magnetic field strength of the magnet 60 (reference magnet) to learn the position offset amount of the lens holder 30, the magnetic element M2 in FIG. 10F is no longer needed, so that the space for other components in the lens driving module can be increased, to achieve miniaturization of the lens driving mechanism.

Figure 11:
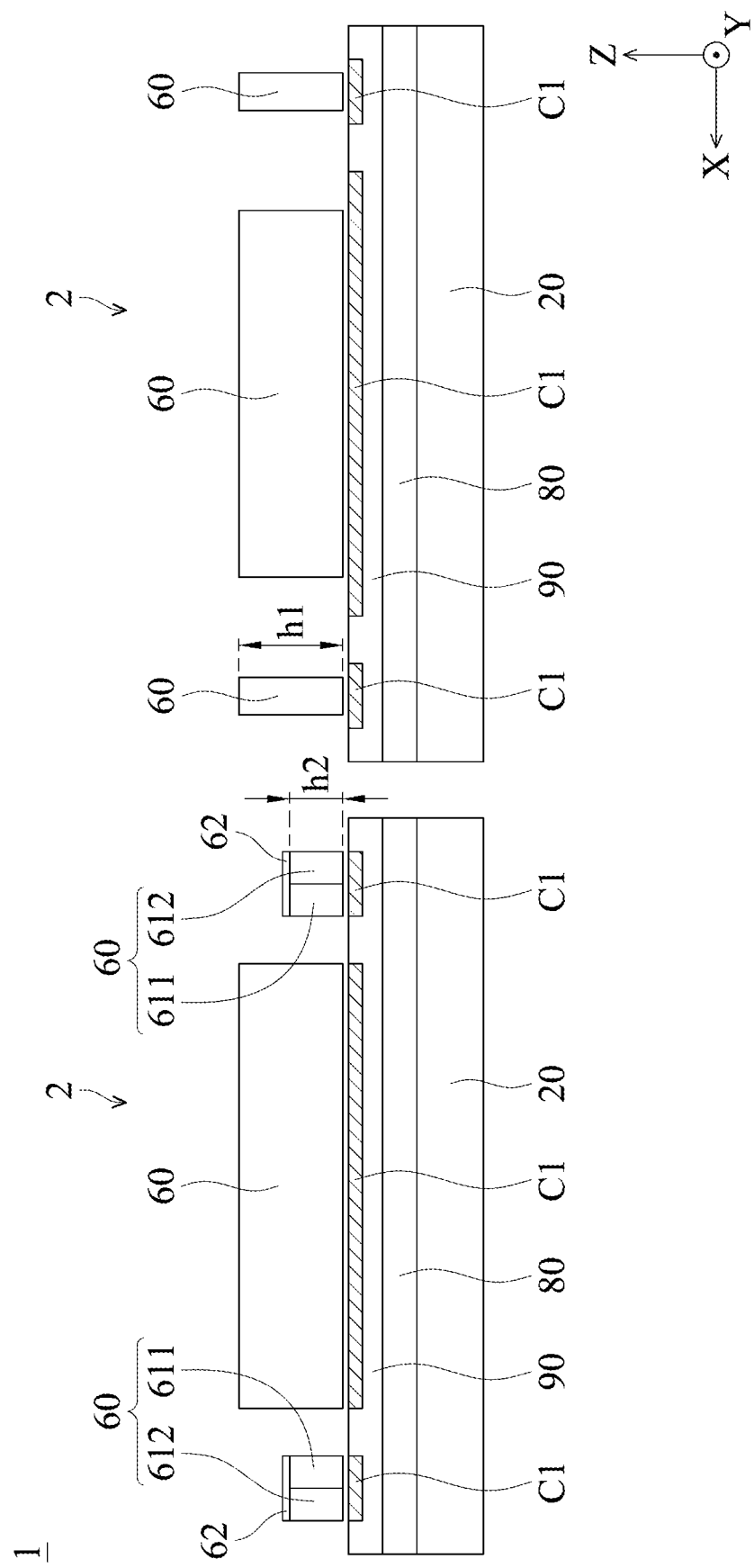
FIG. 11 is a schematic view showing relative positions of the magnets and coils of a lens driving mechanism in accordance with another embodiment of the invention.

FIG. 11 shows relative positions of magnets and coils of a lens driving mechanism 1 in accordance with another embodiment of the invention. For the sake of simplicity and clarity, the lens holder 30, the coils 40, and the frame 50 are not presented in FIG. 11. As shown in FIG. 11, the driving board 90 in the right lens driving module 2 is disposed above the base 20 (second base), and the coils C1 (second coils) disposed in the driving board 90 can electromagnetically act with the magnets 60 (second magnets), whereby the frame 50, the lens holder 30, and the lens (second lens) received in the lens holder 30 can be moved along the horizontal direction to perform the OIS function. In some embodiments, the bases 20 (first and second bases) of the two lens driving modules 2 can be integrally formed in one piece.

Still referring to FIG. 11, the left lens driving module 2 has a multipolar magnet 60 (first magnet) adjacent to the right lens driving module 2, and a magnetic permeable element 62 is disposed on the multipolar magnet 60. Specifically, the thickness h1 of the magnet 60 (second magnet) in the right lens driving module 2 is greater than the thickness h2 of the magnet 60 (first magnet) in the left lens driving module 2. Moreover, the top surfaces of the left and right magnets 60 are both perpendicular to the light incident direction (Z axis), and the top surface (first top surface) of the left magnet 60 (first magnet) is located at a different height from the top surface (second top surface) of the right magnet 60 (second magnet). Thus, the electromagnetic force between the two lens driving modules 2 can be reduced, and the space for other components in the left lens driving module 2 can be increased, to achieve high performance and miniaturization of the lens driving mechanism 1.

Although embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. A lens driving mechanism for driving a first lens and a second lens to move, wherein light enters the first and second lenses along a light incident direction, the lens driving mechanism comprising:
    a first lens driving assembly, comprising a first magnetic element for driving the first lens to move; and
    a second lens driving assembly, comprising a second magnetic element for driving the second lens to move, wherein the first magnetic element is located adjacent to the second magnetic element, and a first polar direction of the first magnetic element is different from a second polar direction of the second magnetic element.

2. The lens driving mechanism as claimed in claim 1, wherein the first polar direction of the first magnetic element is perpendicular to the second polar direction of the second magnetic element.

3. The lens driving mechanism as claimed in claim 2, wherein the first polar direction of the first magnetic element is parallel to the light incident direction, and the second polar direction of the second magnetic element is perpendicular to the light incident direction.

4. The lens driving mechanism as claimed in claim 1, wherein the first magnetic element comprises a multipolar magnetic element that has a first magnetic portion and a second magnetic portion, and the polar directions of the first and second magnetic portions are opposite to each other.

5. The lens driving mechanism as claimed in claim 1, wherein the first and second magnetic elements have different thicknesses along the light incident direction.

6. The lens driving mechanism as claimed in claim 1, wherein the first magnetic element has a first top surface perpendicular to the light incident direction, and the second magnetic element has a second top surface perpendicular to the light incident direction, wherein the first top surface is located at a different height from the second top surface in the light incident direction.

7. The lens driving mechanism as claimed in claim 1, further comprising a position sensor to detect the position of the first magnetic element or the second magnetic element.

8. The lens driving mechanism as claimed in claim 1, wherein the first driving assembly further has a first coil corresponding to the first magnetic element for driving the first lens to move, and the second driving assembly further has a second coil corresponding to the second magnetic element for driving the second lens to move.

9. The lens driving mechanism as claimed in claim 8, further comprising a first base movably connected to the first lens, wherein the first coil is disposed on the first base and located corresponding to the first magnetic element for moving the first lens to move relative to the first base in a horizontal direction, wherein the horizontal direction is perpendicular to the light incident direction.

10. The lens driving mechanism as claimed in claim 9, further comprising a second base, wherein the second coil is disposed on the second base and corresponds to the second magnetic element for driving the second lens to move relative to the second base.

11. The lens driving mechanism as claimed in claim 9, further comprising a lens holder for holding the first lens, a frame connected to the first base, a magnetic field sensor disposed on an outer side of the lens holder, and a magnet disposed on the frame, wherein the magnetic field sensor measures the magnetic field strength of the magnet to learn the position offset of the first lens holder relative to the first base.

12. The lens driving mechanism as claimed in claim 11, further comprising a conductive circuit formed on the lens holder by insert molding, Laser Direct Structuring, or Molded Interconnect Devices technology, wherein the first coil is a planar coil disposed on the lens holder and electrically connected to the conductive circuit.

13. The lens driving mechanism as claimed in claim 11, wherein the lens holder has a substantially rectangular structure, and the magnetic field sensor is disposed at a corner of the lens holder.

14. The lens driving mechanism as claimed in claim 11, wherein the lens holder has a substantially rectangular structure, and the magnetic field sensor and the magnet are disposed on a side of the lens holder, corresponding to the magnet.

15. The lens driving mechanism as claimed in claim 14, further comprising a magnetic permeable element connected to the first magnetic element and situated between the magnet and the first magnetic element.

16. The lens driving mechanism as claimed in claim 1, further comprising a magnetic permeable element connected to the first magnetic element.

17. The lens driving mechanism as claimed in claim 16, wherein the first driving assembly further has a first coil corresponding to the first magnetic element for driving the first lens to move, and the magnetic permeable element is disposed on a side of the first magnetic element, wherein the first magnetic element is located between the magnetic permeable element and the first coil.

18. The lens driving mechanism as claimed in claim 1, wherein the second polar direction of the second magnetic element is parallel to the light incident direction.

19. The lens driving mechanism as claimed in claim 1, further comprising two magnetic permeable elements respectively disposed on the first and second magnetic elements.

20. The lens driving mechanism as claimed in claim 1, wherein the first and second magnetic elements are both multipolar magnetic elements.

* * * * *